(12) United States Patent
Manohar et al.

(10) Patent No.: US 11,748,068 B2
(45) Date of Patent: Sep. 5, 2023

(54) BUILDING BASE APPLICATIONS WITH USER INTERFACE MICRO FRONTENDS

(71) Applicant: ORACLE FINANCIAL SERVICES SOFTWARE LIMITED, Mumbai (IN)

(72) Inventors: Vijay Nair Manohar, Chino Hills, CA (US); Pawan Sahani, Pune (IN); Shripad Deshpande, Pune (IN)

(73) Assignee: Oracle Financial Services Software Limited, Mumbai (IN)

(*) Notice: Subject to any disclaimer, the term of this patent is extended or adjusted under 35 U.S.C. 154(b) by 16 days.

(21) Appl. No.: 17/667,269

(22) Filed: Feb. 8, 2022

(65) Prior Publication Data

US 2023/0251835 A1    Aug. 10, 2023

(51) Int. Cl.
    *G06F 8/36*      (2018.01)
    *G06F 8/71*      (2018.01)

(52) U.S. Cl.
CPC . *G06F 8/36* (2013.01); *G06F 8/71* (2013.01)

(58) Field of Classification Search
None
See application file for complete search history.

(56) References Cited

U.S. PATENT DOCUMENTS

| | | | |
|---|---|---|---|
| 11,630,941 B1* | 4/2023 | Gottlieb | G06F 3/0481 715/234 |
| 2020/0285516 A1 | 9/2020 | Darling et al. | |
| 2021/0192106 A1* | 6/2021 | Bourhani | G06F 30/20 |
| 2021/0248205 A1* | 8/2021 | Tank | G06F 16/986 |
| 2022/0188162 A1* | 6/2022 | Darling | G06F 8/30 |
| 2022/0206762 A1* | 6/2022 | Makhija | G06F 8/36 |

OTHER PUBLICATIONS

Pavlenko, "Micro-frontends: application of microservices to web front-ends", 2020, Journal of Internet Services and Information Security (JISIS), (Year: 2020).*

Oracle; Learn About Architecting Microservices-Based Applications on Oracle Cloud, pp. 1-7, Jun. 2021 (copyright 2018, 2021, Oracle and/or its affiliates; downloaded on Feb. 1, 2022 from: https://docs.oracle.com/en/solutions/learn-architect-microservice/index.html#GUID-BDCEFE30-C883-45D5-B2E6-325C241388A5.

Vijay Nair—Oracle; DEV-4702 Micro Front Ends for Micro Services, pp. 1-16, Copyright 2018, Oracle.

* cited by examiner

*Primary Examiner* — Hossain M Morshed
(74) *Attorney, Agent, or Firm* — Kraguljac Law Group, LLC

(57) ABSTRACT

Systems, methods, and other embodiments associated with a technique for using micro frontends to build a runtime version of a base application are described. In one embodiment, the method allows for selected micro frontends to be incorporated into the base application. Metadata corresponding to the selected micro frontend is identified and parsed to identify at least one or more application programming interfaces (APIs) that are defined in the metadata. The identified APIs are incorporated with the micro frontends to create a final version of the micro frontend. The runtime version of the base application is constructed by combining the final version of the micro frontends with the base application.

20 Claims, 4 Drawing Sheets

BUILDING BASE APPLICATIONS WITH USER INTERFACE MICRO FRONTENDS

BACKGROUND

In a monolithic architecture, the entire application is built as a single unit that contains all the business logic. In other words, the entire application is designed, developed, and deployed as a single unit. A frontend application monolith is a common problem especially arising in enterprise applications. In some systems, backend application architecture has been designed to be modular. However, the frontend application is still developed in a single codebase and as a large monolithic application.

Thus, any change to the code of the monolithic application, however small, requires redeploying and restarting the entire application. Furthermore, when changes are made to a single backend service that interacts with the frontend application, changes may also be required for the frontend application. Consequently, the frontend application may become problematic since it may eventually be too hard to efficiently manage due to its monolithic structure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Figure 1:
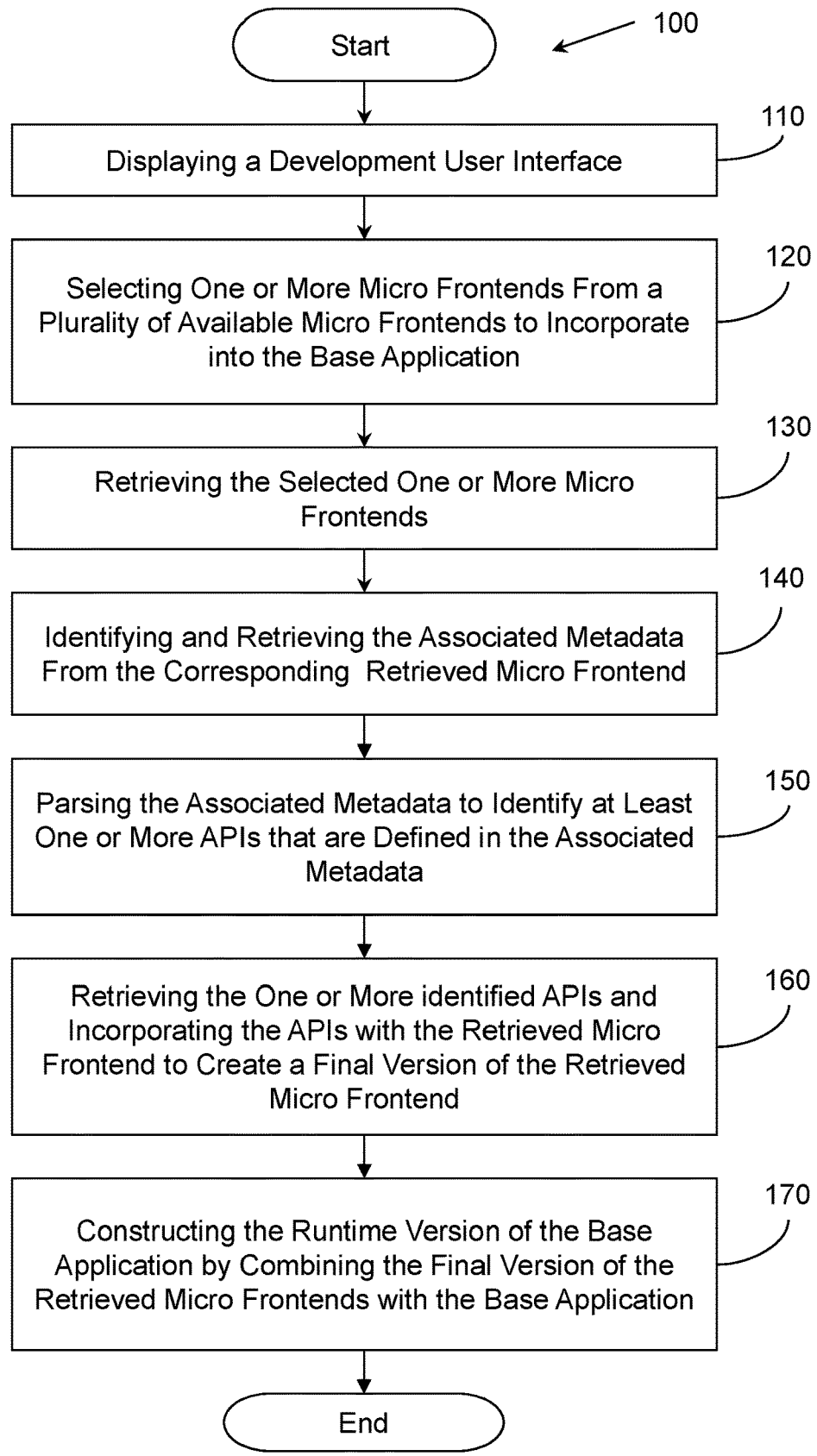
FIG. 1 illustrates one embodiment of a method for building a runtime version of a base application using micro frontends.

Systems and methods are described herein that implement a technique for using micro frontends to build a runtime version of a base application. In one embodiment, a frontend user interface (UI) application that was previously a monolithic single application is redesigned into a micro frontend architecture. The UI micro frontend architecture redesigns a monolithic single UI application by decomposing the UI frontend application into individual, independent, multiple smaller stand-alone applications.

In the present micro frontend architecture, the present implementation technique allows for selected micro frontends to be incorporated into the base application at run-time. Since their may be dozens or hundreds of different available UI micro frontend applications, a particular base application does not use or need all the available UI micro frontends. Thus, only UI micro frontends that provide UI functions used by the base application are selected to build an application user interface for the run-time version of the base application.

For each selected UI micro frontend, metadata corresponding to the selected micro frontend is identified and parsed. The parsing is configured to identify at least one or more application programming interfaces (APIs) that are defined in the metadata. The identified APIs are incorporated with the micro frontends to create a final version of the micro frontend. Finally, the runtime version of the base application is constructed by combining all the selected micro frontends with the base application logic.

In a microservices architecture that is used for backend applications, an application includes loosely coupled services. Each service supports a single business task. Conversely, in a monolithic architecture, the entire application is designed and deployed as a single unit, as discussed above. Also, in a microservices architecture, each microservice (such as a micro frontend) is responsible for a simple task and communicates with the clients or with other microservices by using lightweight communication mechanisms such as representational state transfer (REST) API requests. This enables the application developer to design an application as a collection of loosely coupled services. Finally, microservices follow the share-nothing model and run as stateless processes. This approach makes it easier to scale and maintain the application.

A micro frontend is a program development approach in which a frontend application is broken down into individual applications that work together. The micro frontend concept allows for the concepts of microservices to be applied to the frontend applications. In particular, the micro frontend application approach may build a feature-rich browser application (such as a single page application), which is associated with a microservices architecture.

In particular, micro frontend applications could be considered to be an application that is composed of features which may be owned and developed by independent teams of programmers/developers. Each team may have a distinct area of operation, function, or mission it focuses on. Each team may be cross functional and may develop the features related to an area of operation, function, or mission from end-to-end and from the database to the user interface.

In one embodiment, a micro frontend is configured to include an API layer that is configured as the entry point for all client requests to a microservice (such as a micro frontend). The API layer is also configured to enable the microservices to communicate with each other over HTTP, gRPC, and TCP/UDP. Also, the APIs, which the components use to communicate over the network, may be lightweight for it to count as a microservice, as well. Finally, the API may be configured to dictate the microservice's (micro frontend's) functionality. This is the feature that allows developers to link microservices together into a larger modular environment.

In one embodiment, the micro fronted may be also configured to include a logic layer that is configured to perform a single task (e.g., code which focuses on a single business task), thereby minimizing the dependencies on the other applications (e.g., other microservices or other micro frontends). This layer can be written in a different language for each microservice.

Finally, in one embodiment, the micro frontend may be configured to include a data store layer that provides a persistence mechanism, such as a database storage engine, log files, and so on.

In one embodiment, in a microservices architecture, the services run on multiple servers (such a component server 466 (FIG. 4)). The communication between these services (including micro frontends) through a server, such as a component server 466, occurs through communication protocols such as HTTP, AMQP, and TCP. HTTP/REST and asynchronous messaging are widely used protocols. A REST API for web services uses the HTTP protocol. With HTTP methods (such as GET, POST, PUT, and DELETE), clients can access and manipulate the application resources by using a uniform resource locator (URL). Clients send a request to a microservice through a REST API that represents an entry point to the application's functionality. Clients can communicate with microservices (such as micro frontends) either directly or through an API gateway. An API gateway pattern defines a single-entry point for all requests to the microservices. When a client request arrives, the API gateway routes the request to the appropriate microservice. A variant of the API gateway pattern is the backend for frontend pattern, which defines a separate API gateway for each kind of client (for example, one gateway for mobile clients and another for web applications).

In one embodiment, minimizing communication between the microservices is a consideration for their operation. When communication is essential, asynchronous communication is preferable. In this manner, the microservice that sends a request can continue operating without waiting for a response. Messaging queues and streaming systems are methods of providing asynchronous communication, and when integrated in the database they provide transactional semantics for a data operation and the sending of a message. This makes microservices simpler and more scalable to deploy.

In one embodiment, micro frontend program development may provide one or more of the following advantages:
A. Different independent teams of engineers/programmers/developers can develop independent micro frontends. Each team can choose and upgrade its micro frontend application without having to coordinate with other micro front ends and their development teams.
B. Each team can isolate the code of the micro frontend(s) they are developing from other teams developing other micro frontends.
C. Each micro frontend program can be tested and maintained independently without having to involve other micro frontends or coordinate with other development teams. For an application to qualify as a microservice, the application should be able to be updated independently without having to change configurations of the network or other application.
D. The micro frontend approach allows a client system to be built by scalable, resilient micro frontend applications by using a selected number of micro frontends that are needed without using all possible micro frontends that are available to the system. Selecting and using micro frontends and microservices on an as-needed basis allow a client system to increase its computing resources in case of an unexpected rush or surge in demand from the client system. This means that the client system does not have to pay for microservices that it is not using. It also means that the client system can scale back on resources once the micro frontends or microservices are no longer necessary so the client system can lower operating costs.
E. Each micro frontend program may be deployed independently from other programs.
F. The micro frontends are loosely coupled.
G. The micro frontends may be organized by functional capability.
H. The micro frontends may be run by small teams.
I. Each micro frontend is fully functional completely on its own, is self-contained, and is able to run of its own volition. Communication via other apps, services, microservices, and databases is accomplished via an API.

With reference to FIG. 1, one embodiment of a method/system 100 for building a runtime version of a base application using micro frontends is illustrated. In particular, the method/system 100 provides a mechanism to build an application user interface that will be a frontend user interface for the base application, where the base application functions on a backend of a computing system in one embodiment.

Since the base application (base application logic) does not have an associated frontend user interface that is hard coded with the base application logic, the base application may be regarded as an application shell. The base application logic needs one or more user interface functions to be fully functional at run-time and these user interface functions will be provided by one or more UI micro frontends via the method/system 100.

The one or more UI micro frontends that are missing and needed by the base application may be referred to as dependent components since the base application logic depends on the UI functions provided by these components during run-time. In one embodiment, the UI functions that are missing and needed by the base application logic will be known to an application developer that is familiar with and responsible for building and deploying the base application.

A final version (run-time application version) of the base application can be built at run-time by dynamically building the frontend application user interface using selected micro frontend components. Method 100 will be described using a micro frontend development user interface 200 shown in FIG. 2. FIG. 3 illustrates a representation of a final run-time application 320 that is built by combining the constructed application user interface 300 and the base application logic 315.

The method 100 is performed by at least a processor of a computer system that accesses and interacts with memories and/or data storage devices. For example, the processor at least accesses and reads/writes data to the memory and processes network communications to perform the actions of FIG. 1.

Figure 2:
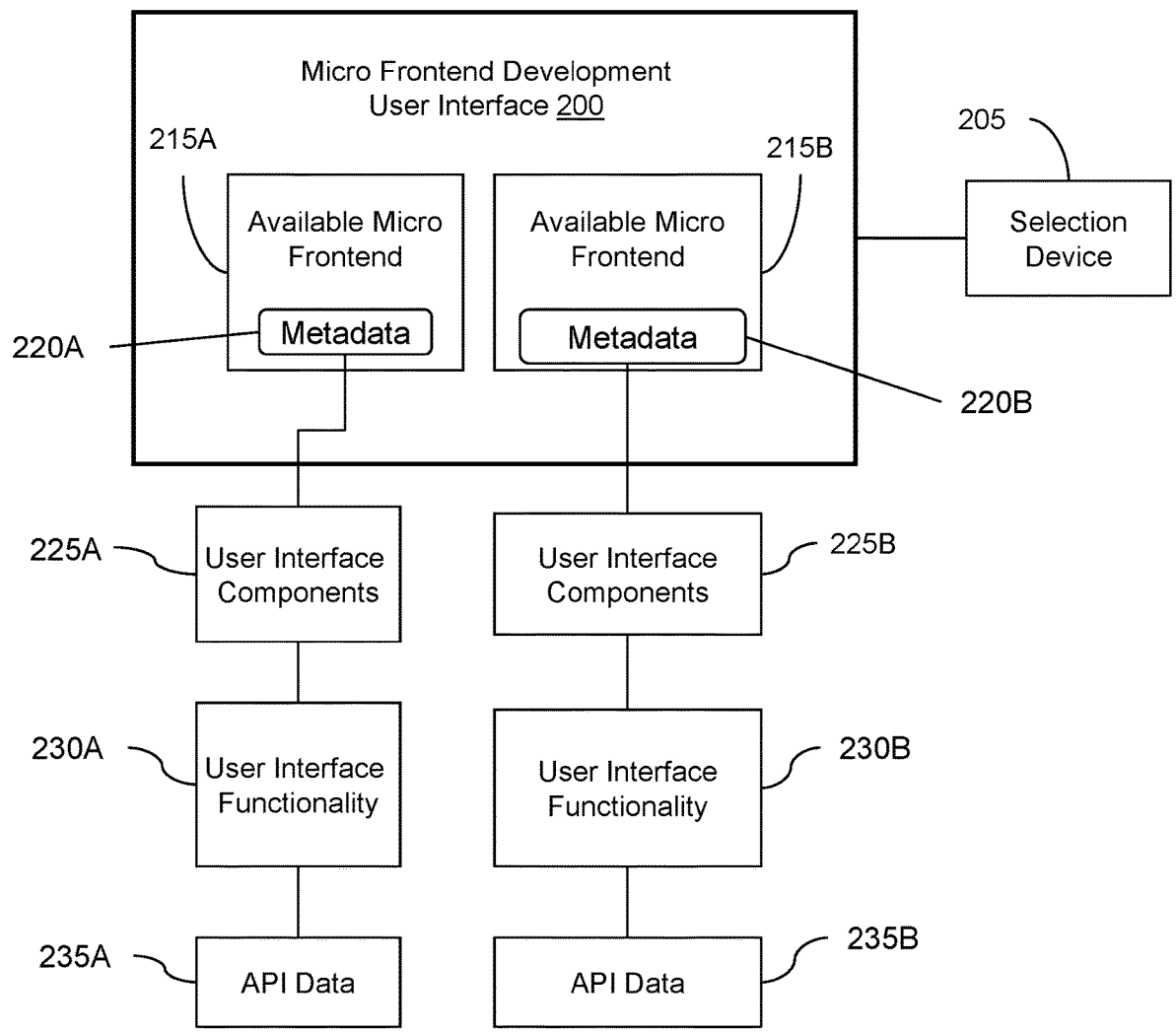
FIG. 2 is a schematic illustration, in one embodiment, of a micro frontend development user interface associated with FIG. 1.
Figure 3:
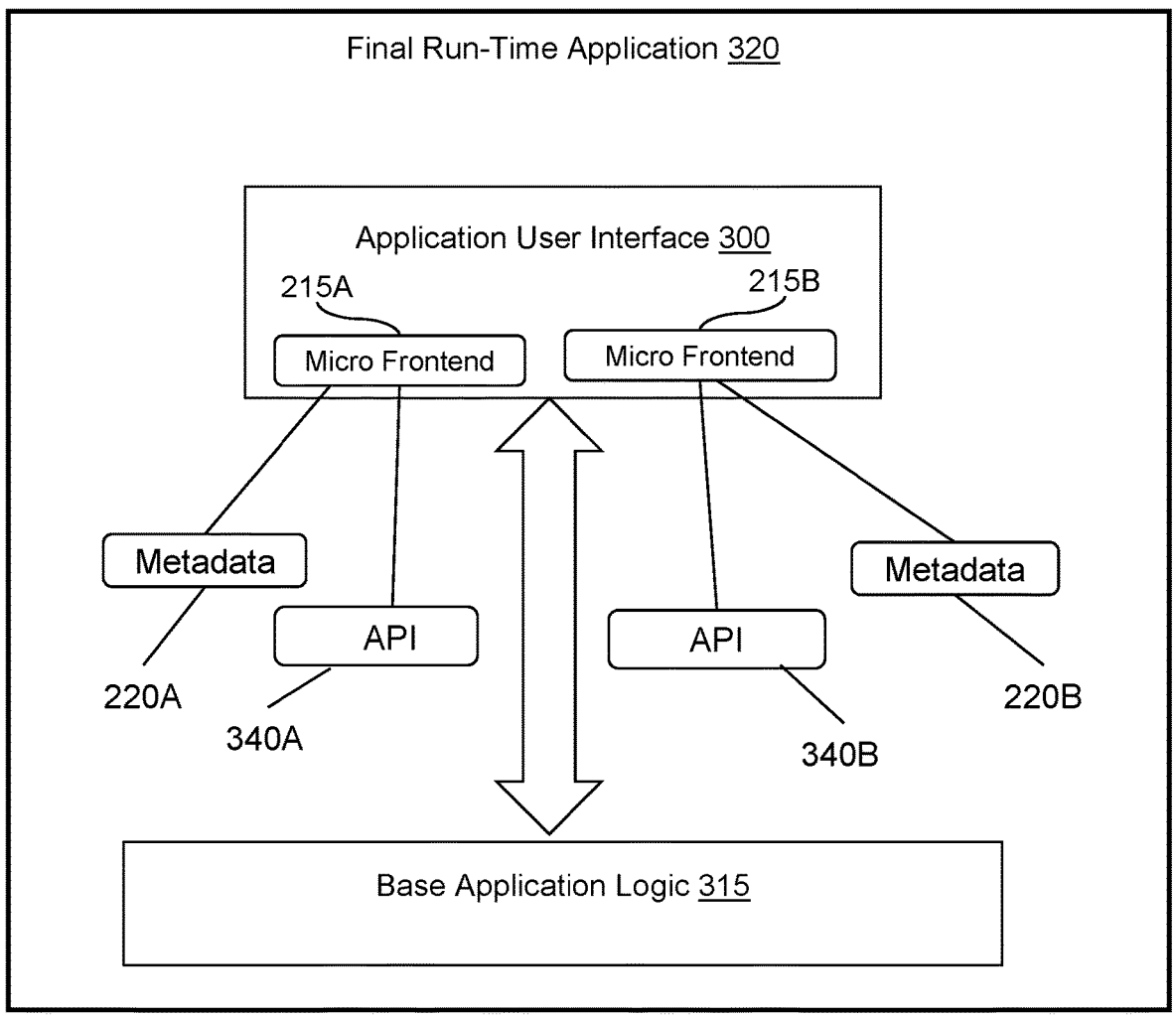
FIG. 3 is a schematic illustration of a final run-time application that is constructed by combining an application user interface and base application logic associated with FIGS. 1 and 2, in one embodiment.

With reference to FIGS. 1 and 2, at block 110, the method 100 is initiated when a base application is to be deployed and the system displays a development user interface (UI) 200 (FIG. 2). The development UI 200 is configured to provide and display a list of micro frontends that are available on the system. For example, there may be dozens of available micro frontends each configured to perform a specific task. The development UI 200 may provide an option to select (using selection device 205) one or more micro frontends from a plurality of available micro frontends to incorporate into the base application. While only two (2) available micro frontends 215A and 215B are shown in FIG. 2 as being displayed, any number of available micro frontends may be displayed.

As previously stated, the application developer that is building and deploying the base application should have knowledge of which user interface functions are needed by the base application in order to select the appropriate micro front ends from the available list. In another embodiment, a configuration file may be created in advance that identifies the UI micro frontends needed by the base application. The method/system 100 at block 120 may then identify the selected micro frontends from the configuration file in an automated process.

With reference to FIG. 2, each micro frontend (215A and 215B) is stored in a database 404 (FIG. 4) or other type of library that may be accessed via network communication to retrieve the selected micro frontend. Each micro frontend 215A and 215B is configured with an associated metadata (220A and 220B, respectively). Each metadata (220A and 220B) is configured to include properties and attributes of its associated micro frontend including for example user interface components (225A and 225B, respectively), user interface functionality (230A and 230B, respectively), and application programming interface (API) data (235A and 235B, respectively), as will be described in greater detail later.

In one embodiment, the user interface components and the user interface functionality can be used to assist in configuring customized user interface (UI) portions for an application. In another embodiment, the application programming interface (API) data can be used to identify, locate, and retrieve an API associated with the corresponding metadata. It is to be understood that the metadata 220A and 220B may also include other related information available/configured for each of the micro frontends 215A and 215B, as will be discussed in greater detail later.

In one embodiment, the metadata is contained in a file that is written in java script object notation code (JSON code) in order to configure the fields and categories for document abstraction. The metadata file configures field categories and lists available, as well as what type of values are permitted for each field. In this manner, the JSON code can be used to identify and extract key data points and relevant information from the metadata. Furthermore. JSON can be used as a format for storing and transporting data and can be used when data is sent from a server (such as component server 466 (FIG. 4)) to a web page or an executing application.

In one embodiment, each micro frontend is configured with hard coding and is an executable file/code. Typically, hard coded software is compiled from source code of a program into an executable file or other executable object. Usually, the hard-coded, executable data can only be modified by editing the source code and then the source code must be recompiled into executable code before the edits take effect and can be used.

Conversely, in one embodiment, the metadata associated with each micro frontend is coded with JSON code that is preferably not executable and does not need to be compiled. In this manner, the JSON code can be directly modified through user input, for example, by editing the text of the metadata to change the parameters and/or configuration of the APIs or other properties of the associated micro frontend. Since the metadata is not executable code, the metadata may be modified without having to recompile the code of the metadata and without having to recompile the executable code in the associated micro frontend. Thus, the non-executable metadata can be implemented along with the executable code of the micro frontend at runtime of the base application which is unique aspect of the present system.

Furthermore, the JSON code in the metadata can be used to configure the application user interface 300 (FIG. 3). For example, the JSON code can be used to configure the APIs of the application user interface 300, configure a graphical layout of the application user interface 300 used by the base application 315, configure the format of the data fields on user interface screens used by the base application 315, configure menu options of the application user interface 300, configure images, configure variables used in the application user interface 300 and where values of the variables come from, and configure the content of the application user interface 300 for the base application 315, etc. In this manner, the JSON code allows the component server 446 to retrieve the information from the database and properly display the information as part of the application user interface 300 built from the selected micro frontends.

Returning to FIG. 1, in block 120 of FIG. 1, the development user interface 200 is configured to allow the application developer to select one or more micro frontends 215A and 215B from the plurality of available micro frontends to incorporate into the base application 315 (FIG. 3). In one embodiment, the plurality of available micro frontends is stored in database 404 (FIG. 4) or other type of library of components.

In block 130, a component server (such as component server 466 in FIG. 4) retrieves the selected one or more micro frontends 215A and/or 215B from the database 404. As discussed above, each of the micro frontends will include metadata (220A/220B) and each metadata (220A and 220B) will be configured to include user interface components (225A/225B, respectively), user interface functionality (230A/230B, respectively), and application programming interface (API) data (235A/235B, respectively).

In block 140, the component server 466 identifies and retrieves the associated metadata (220A/220B) from the corresponding retrieved micro frontend (215A/215B). In particular, the component server 466 will identify and retrieve the metadata 220A from the corresponding retrieved micro frontend 215A and, if necessary, the component server 466 will also identify and retrieve the metadata 220B from the corresponding retrieved micro frontend 215B.

Once the metadata is identified and retrieved, in block 150, the component server 466 parses the associated metadata to identify at least one or more application programming interfaces (APIs) that are defined in the associated metadata. For example, the component server 466 will parse API data 235A of metadata 220A to identify API 340A (FIG. 3) since API 340A is associated with API data 235A in metadata 220A. Also, if needed, component server 466 can parse API data 235B of metadata 220B to identify API 340B (FIG. 3) since API 340B is associated with API data 235B in metadata 220B.

The APIs provide a system of tools and resources in an operating system which enables application developers to create software applications. Additionally, APIs are used when programming graphical user interface (GUI) components such as application user interface 300 (FIG. 3). In one embodiment, an API is configured to be able to connect to and/or communicate with external devices such as the database 404 (FIG. 4) and send data to the component server 466. The component server 466 is configured to then retrieve that data, interpret the data, perform one or more requested actions based on the data to generate result data, and send the result data back to the micro frontends 215A/215B (such as a retrieved micro frontend) in application 315 (FIG. 3). Finally, the API in the micro frontend is configured to be able to then interpret that data and present the data in the base application 315.

Returning to FIG. 1, in block 160, the component server 466 retrieves the one or more identified APIs from the API database 417 (FIG. 4) and incorporates the APIs with the retrieved micro frontend to create a final version of the retrieved micro frontend. For example, the component server 466 will retrieve API 340A and incorporate API 340A with the retrieved micro frontend 215A to create a final version of the retrieved micro frontend 215A in application 315 (FIG. 3). In this manner, the final version of the retrieved micro frontend 215A will now include the metadata 220A and the API 340A (FIG. 3). Also, for each retrieved micro frontend, component server 466 will retrieve API 340B and incorporate API 340B with the retrieved micro frontend 215B to create a final version (e.g., executable run-time version) of the retrieved micro frontend 215B in application 315. In this manner, the final version of the retrieved micro frontend 215B will now include the API 340B (FIG. 3).

In block 170, the component server 466 is configured to construct a final runtime version 320 of the base application logic 315 (shown in FIG. 3) by combining the final versions of the retrieved micro frontends that create the final application user interface 300 with the base application logic 315. In this manner, the final version of the retrieved micro frontends 215A and 215B have been combined with the base application logic 315 during runtime of the base application logic 315 (FIG. 3) so that the base application logic 315 can communicate with and use the functions of the application user interface 300. As a result, a fully functional run-time application 320, which includes a combination of the application user interface 300 and the based application logic 315, is dynamically constructed at run-time. The final runtime application 320 may then be deployed and executed on a computing system.

Computing Device Embodiment

Figure 4:
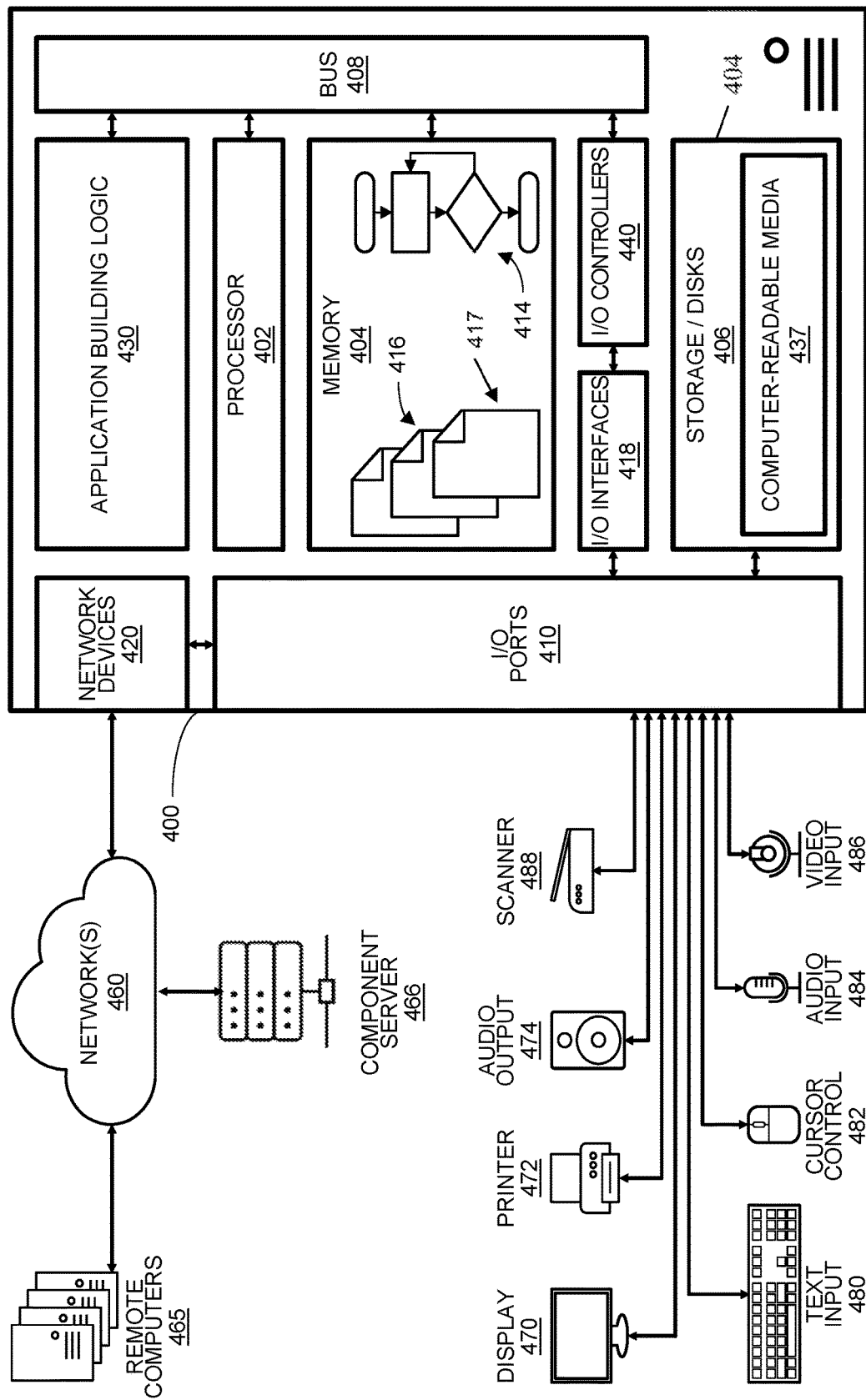
FIG. 4 illustrates an embodiment of a special purpose computing system configured with the example systems and/or methods disclosed.

FIG. 4 illustrates an example computing device that is configured and/or programmed as a special purpose computing device with one or more of the example systems and methods described herein, and/or equivalents. The example computing device may be a computer 400 that includes a processor 402, a memory 404, and input/output ports 410 operably connected by a bus 408. In one example, the computer 400 may include application building logic 430 configured to facilitate building a runtime version of an application using micro frontends similar to method/system 100 shown in FIGS. 1, 2, and 3. In different examples, the application building logic 430 may be implemented in hardware, a non-transitory computer-readable medium 437 with stored instructions, firmware, and/or combinations thereof. While the logic 430 is illustrated as a hardware component attached to the bus 408, it is to be appreciated that in other embodiments, the application building logic 430 could be implemented in the processor 402, stored in memory 404, or stored in disk 406.

In one embodiment, application building logic 430 or the computer is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to build application during runtime. The means may also be implemented as stored computer executable instructions that are presented to computer 400 as data 416 that are temporarily stored in memory 404 and then executed by processor 402.

Logic 430 may also provide means (e.g., hardware, non-transitory computer-readable medium that stores executable instructions, firmware) for performing the building of an application during runtime.

Generally describing an example configuration of the computer 400, the processor 402 may be a variety of various processors including dual microprocessor and other multiprocessor architectures. A memory 404 may include volatile memory and/or non-volatile memory. Non-volatile memory may include, for example, ROM, PROM, EPROM, EEPROM and so on. Volatile memory may include, for example, RAM, SRAM, DRAM, and so on.

A storage disk 406 may be operably connected to the computer 400 via, for example, an input/output (I/O) interface (e.g., card, device) 418 and an input/output port 410 that are controlled by at least an input/output (I/O) controller 440. The disk 406 may be, for example, a magnetic disk drive, a solid-state disk drive, a floppy disk drive, a tape drive, a Zip drive, a flash memory card, a memory stick, and so on. Furthermore, the disk 406 may be a CD-ROM drive, a CD-R drive, a CD-RW drive, a DVD ROM, and so on. The memory 404 can store a process 414, a data 416 and/or API database 417, for example. The disk 406 and/or the memory 404 can store an operating system that controls and allocates resources of the computer 400.

The computer 400 may interact with input/output (I/O) devices via the input/output (I/O) controller 440, the I/O interfaces 418 and the input/output ports 410. Input/output devices may be, for example, a keyboard, a microphone, a pointing and selection device, cameras, video cards, displays 470, the disk 406, the network devices 420, printer 472, audio output 474, scanner 488, text input 480, cursor control 482, audio input 484, video input 486, and so on. The input/output ports 410 may include, for example, serial ports, parallel ports, and USB ports.

The computer 400 can operate in a network environment and thus may be connected to the network devices 420 via the I/O interfaces 418, and/or the I/O ports 410. Through the network devices 420, the computer 400 may interact with a network 460. Through the network 460, the computer 400 may be logically connected to remote computers 465 and/or component server 466. Networks 460 with which the computer 400 may interact include, but are not limited to, a LAN, a WAN, and other networks.

Definitions and Other Embodiments

In one embodiment, the present application building method/system 100 is implemented by a computing/data processing system including an application or collection of distributed applications for enterprise organizations. The applications and computing system may be configured to operate with or be implemented as a cloud-based networking system, a software as a service (SaaS) architecture, or other type of networked computing solution. In one embodiment, the present application building method/system 100 is a centralized server-side application that provides at least the functions disclosed herein and that is accessed by many users via computing devices/terminals communicating with the computing system 100 (functioning as the server) over a computer network.

In one embodiment, one or more of the components described herein are configured as program modules stored in a non-transitory computer readable medium. The program modules are configured with stored instructions that when executed by at least a processor cause the computing device to perform the corresponding function(s) as described herein.

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A computer-implemented method for building a runtime version of a base application, wherein the computer-implemented method comprises:
    displaying a development user interface (UI) that provides options to select one or more micro frontends from a plurality of available micro frontends to incorporate into the base application;
    wherein the plurality of available micro frontends comprises user interface components and functionality, and wherein a given micro frontend includes associated metadata comprising at least data that identifies one or more application programming interfaces (APIs) used by the given micro frontend;
    in response to one or more micro frontends being selected to incorporate into the base application, retrieving the selected one or more micro frontends;
    for each retrieved micro frontend:
        (i) identifying and retrieving the associated metadata from the corresponding retrieved micro frontend,
        (ii) parsing the associated metadata to identify at least one or more APIs that are defined in the associated metadata, and
        (iii) retrieving the one or more APIs identified, and incorporating the one or more APIs with the retrieved micro frontend to create a final version of the retrieved micro frontend; and
    constructing the runtime version of the base application by combining the final version of the retrieved micro frontends with the base application.

2. The method of claim 1, further comprising:
    configuring each of the plurality of available micro frontends to include:
        an API layer, wherein the API layer is configured to perform the following:
            provide an entry point for client requests to each of the plurality of available micro frontends,
            enable each of the plurality of available micro frontends to communicate with each other, and
            dictate a functionality of each of the plurality of available micro frontends;
        a logic layer that focuses on a single task; and
        a data store layer.

3. The method of claim 1, further comprising:
    configuring a component server to perform the following:
        retrieve the selected one or more micro frontends,
        identify and retrieve the associated metadata from the corresponding retrieved micro frontend,
        parse the associated metadata to identify at least one or more APIs that are defined in the associated metadata,
        retrieve the one or more APIs identified and incorporate the one or more APIs with the retrieved micro frontend to create the final version of the retrieved micro frontend; and
        construct the runtime version of the base application by combining the final version of the retrieved micro frontends with the base application.

4. The method of claim 3, further comprising:
    configuring each of the at least one or more APIs to perform the following:
        connect to a database and send data to the component server,
        retrieve the data, interpret the data, perform one or more actions on the data to generate result data, and send the result data back to the retrieved micro frontend, and
        interpret the data and present the data in the base application.

5. The method of claim 3, further comprising:
    configuring the component server to provide a communication link between each of the plurality of available micro frontends,
    wherein communications between each plurality of available micro frontends occur through a communication protocol including HTTP/REST or asynchronous messaging.

6. The method of claim 1, further comprising:
    configuring the metadata with JSON code,
    wherein the JSON code is used to identify and extract data and information from the metadata and is used as a format for storing and transporting the data.

7. The method of claim 6, further comprising:
    configuring each of the plurality of available micro frontends with executable code; and
    configuring the associated metadata with nonexecutable code that does not need to be compiled after being modified and can be implemented along with the executable code of an associated micro frontend at runtime of the base application.

8. A non-transitory computer-readable medium storing computer-executable instructions that, when executed by a computer including a processor, cause the computer to perform functions comprising:
    display a development user interface (UI) that provides options to select one or more micro frontends from a plurality of available micro frontends to incorporate into a base application;
    wherein the plurality of available micro frontends comprises user interface components and functionality, and wherein a given micro frontend includes associated metadata comprising at least data that identifies one or more application programming interfaces (APIs) used by the given micro frontend;
    in response to one or more micro frontends being selected to incorporate into the base application, retrieve the selected one or more micro frontends;
    for each retrieved micro frontend:
        (i) identify and retrieve the associated metadata from the corresponding retrieved micro frontend, (ii) parse the associated metadata to identify at least one or more APIs that are defined in the associated metadata, and (iii) retrieve the one or more APIs identified and incorporate the one or more APIs with the retrieved micro frontend to create a final version of the retrieved micro frontend; and construct a runtime version of the base application by combining the final version of the retrieved micro frontends with the base application.

9. The non-transitory computer-readable medium of claim 8, further comprising instructions that, when executed by at least the processor, cause the processor to:

configure each of the plurality of available micro frontends to include:
an API layer, wherein the API layer is configured to perform functions comprising:
provide an entry point for client requests to each of the plurality of available micro frontends,
enable each of the plurality of available micro frontends to communicate with each other, and
dictate a functionality of each of the plurality of available micro frontends;
a logic layer that focuses on a single task; and
a data store layer.

10. The non-transitory computer-readable medium of claim 8, further comprising instructions that, when executed by at least the processor, cause the processor to:

configure a component server to perform functions comprising:
retrieve the selected one or more micro frontends,
identify and retrieve the associated metadata from the corresponding retrieved micro frontend,
parse the associated metadata to identify at least one or more APIs that are defined in the associated metadata,
retrieve the one or more APIs identified and incorporate the one or more APIs with the retrieved micro frontend to create the final version of the retrieved micro frontend; and
construct the runtime version of the base application by combining the final version of the retrieved micro frontends with the base application.

11. The non-transitory computer-readable medium of claim 10, further comprising instructions that, when executed by at least the processor, cause the processor to:

configure each of the at least one or more APIs to perform functions comprising:
connect to a database and send data to the component server,
retrieve the data, interpret the data, perform one or more actions on the data to generate result data, and send the result data back to the retrieved micro frontend, and
interpret the data and present the data in the base application.

12. The non-transitory computer-readable medium of claim 10, further comprising instructions that, when executed by at least the processor, cause the processor to:

configure the component server to provide a communication link between each of the plurality of available micro frontends,
wherein communications between each plurality of available micro frontends occur through a communication protocol including HTTP/REST or asynchronous messaging.

13. The non-transitory computer-readable medium of claim 8, further comprising instructions that, when executed by at least the processor, cause the processor to:
configure the metadata with JSON code,
wherein the JSON code is used to identify and extract data and information from the metadata and is used as a format for storing and transporting the data.

14. The non-transitory computer-readable medium of claim 13, further comprising instructions that, when executed by at least the processor, cause the processor to:
configure each of the plurality of available micro frontends with executable code; and
configure the associated metadata with nonexecutable code that does not need to be compiled after being modified and can be implemented along with the executable code of an associated micro frontend at runtime of the base application.

15. A computing system, comprising:
at least one processor connected to at least one memory;
a non-transitory computer readable medium including instructions stored thereon that, when executed by the at least one processor, cause the at least one processor to:
display a development user interface (UI) that provides options to select one or more micro frontends from a plurality of available micro frontends to incorporate into a base application;
wherein the plurality of available micro frontends comprises user interface components and functionality, and wherein a given micro frontend includes associated metadata comprising at least data that identifies one or more application programming interfaces (APIs) used by the given micro frontend;
in response to one or more micro frontends being selected to incorporate into the base application, retrieve the selected one or more micro frontends;
for each retrieved micro frontend:
(i) identify and retrieve the associated metadata from the corresponding retrieved micro frontend,
(ii) parse the associated metadata to identify at least one or more APIs that are defined in the associated metadata, and
(iii) retrieve the one or more APIs identified and incorporate the one or more APIs with the retrieved micro frontend to create a final version of the retrieved micro frontend; and
construct a runtime version of the base application by combining the final version of the retrieved micro frontends with the base application.

16. The computing system of claim 15, wherein the instructions further include instructions that, when executed by at least the processor, cause the processor to:
configure each of the plurality of available micro frontends to include:
an API layer, wherein the API layer is configured to perform the following:
provide an entry point for client requests to each of the plurality of available micro frontends,
enable each of the plurality of available micro frontends to communicate with each other, and
dictate a functionality of each of the plurality of available micro frontends;
a logic layer that focuses on a single task; and
a data store layer.

17. The computing system of claim 15, wherein the instructions further include instructions that, when executed by at least the processor, cause the processor to:

configure a component server to perform functions comprising:

retrieve the selected one or more micro frontends, identify and retrieve the associated metadata from the corresponding retrieved micro frontend, parse the associated metadata to identify at least one or more APIs that are defined in the associated metadata, retrieve the one or more APIs identified and incorporate the one or more APIs with the retrieved micro frontend to create the final version of the retrieved micro frontend; and construct the runtime version of the base application by combining the final version of the retrieved micro frontends with the base application.

18. The computing system of claim 17, wherein the instructions further include instructions that, when executed by at least the processor, cause the processor to:

configure each of the at least one or more APIs to perform the following:

connect to a database and send data to the component server, retrieve the data, interpret the data, perform one or more actions based on the data to generate result data, and send the result data back to the retrieved micro frontend, and interpret the data and present the data in the base application.

19. The computing system of claim 15, wherein the instructions further include instructions that, when executed by at least the processor, cause the processor to:

configure the metadata with JSON code, wherein the JSON code is used to identify and extract data and information from the metadata and is used as a format for storing and transporting the data.

20. The computing system of claim 19, wherein the instructions further include instructions that, when executed by at least the processor, cause the processor to:

configure each of the plurality of available micro frontends with executable code; and configure the associated metadata with nonexecutable code that does not need to be compiled after being modified and can be implemented along with the executable code of an associated micro frontend at runtime of the base application.

* * * * *